United States Patent
Ramanujam et al.

(10) Patent No.: US 10,596,704 B1
(45) Date of Patent: Mar. 24, 2020

(54) GENERATE, SIMULATE, AND EXECUTE A REUSABLE ROBOTICS SOLUTION RECIPE TO EXECUTE A ROBOTIC SOLUTION

(71) Applicant: Rapyuta Robotics Co., Ltd, Tokyo (JP)

(72) Inventors: Praveen Ramanujam, Tokyo (JP); Gajamohan Mohanarajah, Tokyo (JP); Chaitanya Deep Moturi, Tokyo (JP)

(73) Assignee: Rapyuta Robotics Co., Ltd, Tokyo (JP)

( * ) Notice: Subject to any disclaimer, the term of this patent is extended or adjusted under 35 U.S.C. 154(b) by 0 days.

(21) Appl. No.: 16/502,862

(22) Filed: Jul. 3, 2019

Related U.S. Application Data (60) Provisional application No. 62/737,381, filed on Sep. 27, 2018.

(51) Int. Cl.
G05B 19/18 (2006.01)
B25J 9/16 (2006.01)
G05B 17/02 (2006.01)

(52) U.S. Cl.
CPC ............ *B25J 9/1671* (2013.01); *G05B 17/02* (2013.01); *B25J 9/161* (2013.01); *G05B 2219/50391* (2013.01)

(58) Field of Classification Search
None
See application file for complete search history.

*Primary Examiner* — Bhavesh V Amin (57) ABSTRACT

Embodiments herein disclose methods and systems to generate, simulate, and execute a reusable robotic solution recipe for executing a robotic solution. Initially a selection of one or more hardware components to be included in the reusable robotic solution recipe is received at a web user interface. Next a selection of a software component is received from the displayed one more software components to be included in the reusable robotic solution recipe. Next the hardware-vendor agnostic controller executes the reusable robotic solution recipe to determine hardware and environment component configuration for executing the robotic solution. A model descriptor file is invoked to determine defined hardware and environment data configuration. Based on the determined and the defined hardware and environment component configuration execution of the robotic solution is initiated. Next an execution instruction is determined and send to simulated hardware component and hardware components based on a matched constraint condition.

20 Claims, 5 Drawing Sheets

GENERATE, SIMULATE, AND EXECUTE A REUSABLE ROBOTICS SOLUTION RECIPE TO EXECUTE A ROBOTIC SOLUTION

TECHNICAL FIELD

Embodiments herein relate to a robotic solution and more particularly to generating, simulating, and executing a reusable robotics solution recipe to execute a robotic solution by a plurality of robots.

BACKGROUND

Use of robots have grown exponentially in the past two decades. Robots are now being used in almost every field to support humans in complex and labor-intensive work. For example, robots, including robotic arms, are used in warehouses for picking unarranged objects in a bin and placing it in an arranged order at another location.

To provide a robotic solution, a combination of several robot hardware and software solutions are required to work in collaboration. For example, the robotic solution in a warehouse includes a combination of image capturing and object detection software for detecting the objects and one or more robotic arms to pick and drop the detected object. Currently, there is no available solution that allows a user to select different software and hardware components to generate and execute the robotic solution.

In addition, a user may want to check whether a robotic solution executes properly when the robotic solution environment is changed. For example, different warehouses have different layouts, different obstacles, or different positions where the obstacles are positioned. A user may want to check whether the robotic solution executes when any of the environment parameters are changed. Currently there are no solution that allows a user to instantly check whether the generated robotic solution executes in these different environments.

Finally, each robotic company has its own proprietary hardware controller that is used to control robots corresponding to the particular hardware manufacturer. This limits the utility of these controllers to plan and execute a robotic solution that involves robots manufactured by different hardware manufacturers.

BRIEF DESCRIPTION OF THE FIGURES

The embodiments disclosed herein will be better understood from the following detailed description with reference to the drawings, in which.

DETAILED DESCRIPTION

Embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

Embodiments herein discloses a method and system for generating, simulating, and executing a robotic solution recipe to execute a robotic solution by a plurality of robots, according to an embodiment. In one embodiment, the system includes a software framework that allows a user to generate a reusable robotic solution recipe, simulate execution of the reusable robotic recipe, and deploy the reusable robotic solution recipe at a hardware-vendor agnostic controller that executes the reusable robotic solution recipe. A software framework is a universal reusable software environment that provides functionalities to facilitate development and deployment of software applications, products, and solutions.

In one embodiment, the reusable robotic solution recipe include ingredients required to execute a robotic solution. For example, the reusable robotic solution recipe may include software components, hardware components, robotic solution execution information and a model descriptor file that in combination may execute the robotic solution. In one embodiment, a robotic solution is an automated real-world solution executed by a plurality of robots. For example, the automated real-world solution may be a bin-picking operation, a welding operation, etc.

In one embodiment, the hardware components in the reusable robotic solution recipe includes a selection of hardware components that are required for executing the robotic solution, for example, robotic arm, pallet, drones, etc. Software components included in the robotic solution recipe are components that execute on one or more hardware components to execute the robotic solution. Software components are either user selected or auto-selected depending on several other factors, for example, the selected hardware component, environment, etc. In one embodiment, the robotic solution execution information in the robotic solution recipe includes hardware and environment parameters and logic for executing the robotic solution.

In one embodiment, the auto-selection of the software and hardware components are performed based on artificial intelligence provided by the software framework. Example when a 'robotics arm' is selected as a hardware component, the Artificial Intelligence (AI) suggests a list of 'motion planning' software components. This suggestion can be done by intelligent reasoning based on the meta-data of the hardware and software components and a set of rules that encode domain knowledge. Suggestions, including the ranking of the suggestions, can also happen based on usage statistics and user ratings.

In one embodiment, the robotic solution recipe also includes a model descriptor file that includes orientation information related to the different objects that are included in the robotic solution. In one embodiment, the objects include the selected hardware components and the static and dynamic environment objects where the reusable robotic solution is to be executed. An environment may include a physical boundary in which the robotic solution is to be executed. The environment also includes static or dynamic physical objects, for example, a box or a movable tray on a warehouse floor where the robotic solution is to be executed. In one embodiment, orientation information in the model descriptor file includes object transform information, which includes position, rotation, and scale information of the different objects included in the robotic solution. In one embodiment, the reusable robotic solution recipe is executed to either simulate the robotic solution or execute the robotic solution in real world by one or more robots.

In case of simulation, the robotic solution recipe is executed by a simulator and a simulated execution of the robotic solution is displayed at a web User Interface (UI). In case of real-world execution, the hardware vendor-agnostic controller executes the robotic solution recipe and sends instruction to the hardware controllers corresponding to the selected hardware components for executing the robotic solution. The vendor-agnostic hardware controller communicates with the controllers of the selected hardware components to send instructions for executing the robotic solution recipe and receive real-time robot solution execution data that may be used to send execution instructions to the robots.

The present invention therefore provides a technological solution to easily generate and simulate a robotic solution recipe. The present invention also provides a vendor-agnostic hardware controller that executes the robotic solution recipe and communicates with hardware controllers of different vendors to execute the robotic solution by hardware components manufactured by different vendors.

Figure 1:
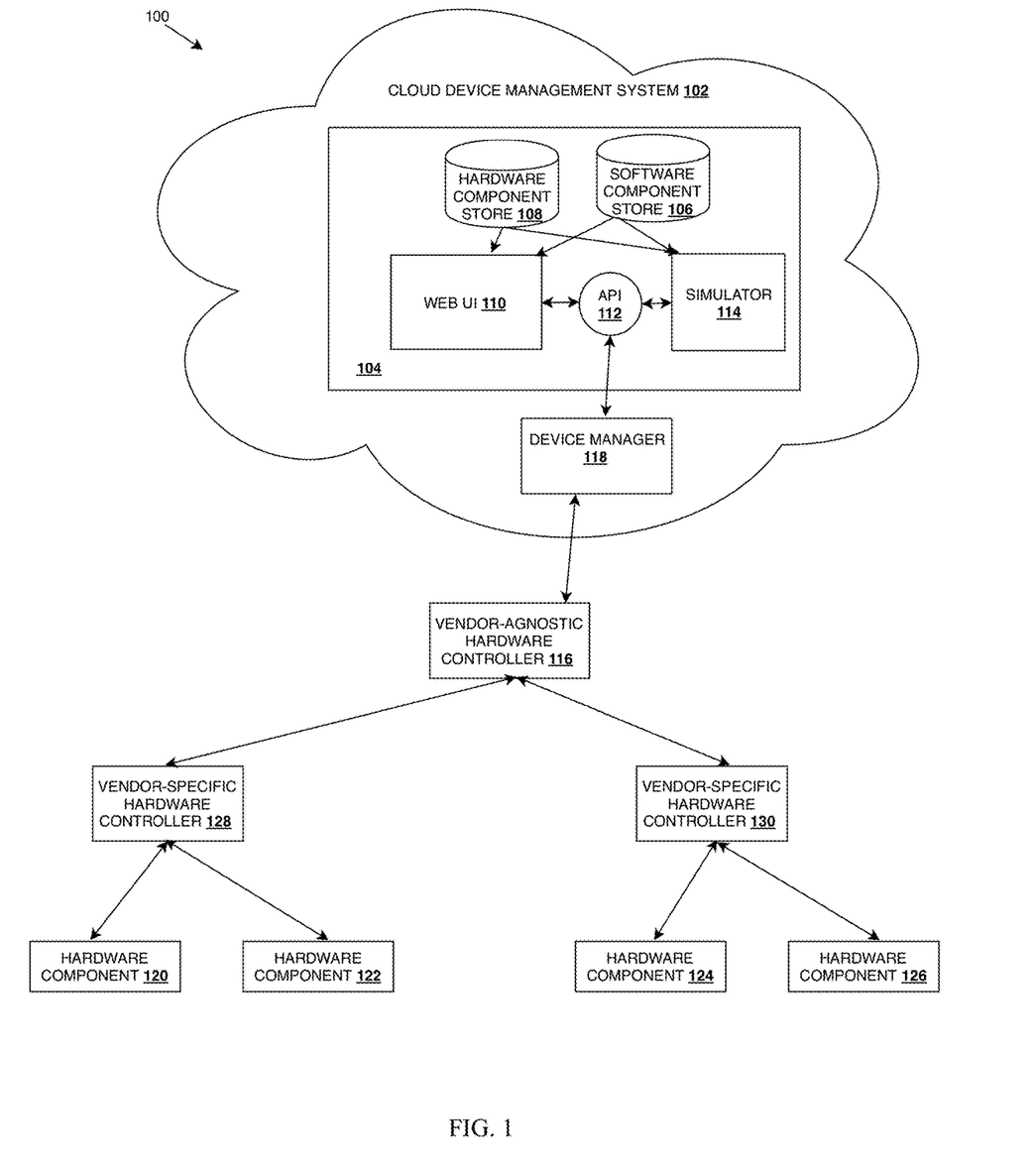
FIG. 1 is a block diagram of a system for generating, simulating, and executing a reusable robotic solution recipe to execute a robotic solution by a plurality of robots, according to an embodiment.

FIG. 1 is a block diagram of a system 100 for generating, simulating, and executing a reusable robotic solution recipe to execute a robotic solution by a plurality of robots, according to an embodiment. In one embodiment, the system 100 includes a cloud device management system 102 that is a platform for generating, simulating, deploying and executing software at cloud and different devices, which includes a vendor-agnostic hardware controller that controls multiple robots. In one embodiment, the cloud device management system 102 is a platform-as-a-service framework. The cloud device management system 102 includes a software framework 104 that allows generation and simulation of a reusable robotics solution recipe. In one embodiment, the software framework 104 includes a software component store 106 and a hardware component store 108. The software component store 106 and the hardware component store 108 stores the software components and the hardware components that are available for generating a reusable cloud robotics solution recipe. In one embodiment, the software framework 104 includes a web user interface (UI) 110 that displays the available software components and hardware components stored at the software component store 106 and hardware component store 108, respectively to allow a user to select one or more software and hardware components for generating the robotics solution recipe.

For example, consider a warehouse solution for moving objects from one shelf to another shelf in the warehouse. This warehouse solution may include a robotic arm (hardware components) for moving objects from one shelf of warehouse to another shelf. This warehouse solution also includes motion detection software (software component) for detecting obstacles on the warehouse floor when moving along the warehouse floor. In this case, the robotic arm and the motion detection software are selected at the web UI 110 for generating a warehouse solution recipe.

In one embodiment, selecting the hardware components include selecting hardware component identifiers corresponding to the hardware components. The hardware component store 108 stores hardware component identifiers corresponding to the hardware components. A hardware component identifier, for example a hardware name, is an identity of a hardware component that is available for executing the robotic solution. A user, for example a hardware developer, may add a list of hardware identifiers corresponding to the hardware components. The web UI 110 may display the hardware identifiers corresponding to the different hardware components and allow a user to select one or more hardware identifiers corresponding to the hardware components that the user wants to include in the robotics solution recipe.

The web UI 110 also allows a user to select different software components from the software component store 106 that are to be included in the robotic solution recipe. The different software components may include software components for performing a particular task, for example, software component for precision placement, inspection, part tracking, visual serving, etc. The software component may also include third party vendor specific software component, for example, third party device drivers. The user, planning the robotic solution, may select one or more software components that is to be included in the reusable robotic solution recipe at the web UI 110. In one embodiment, one or more software components may be auto-selected depending on the hardware components selected for the reusable robotic solution recipe at the web UI 110.

The software component store 106 may also store several solution providers, for example constraint solvers, which provide a solution to a simulated or real-life problem. In one embodiment, a problem may include a constraint that is a pre-defined or an identified condition that is to be solved for executing the robotic solution recipe. For example, consider a robotic solution recipe to transport goods from a conveyor belt to a portable tray by a robotic arm that transports the goods from the conveyor belt on to the portable tray. In this case, when an obstacle is positioned such that it is blocking the movement of the robotic arm then a constraint solver is invoked to determine an alternate path for the robotic arm such that the robotic arm can place the goods from the conveyor belt to the movable tray while avoiding the obstacle.

A constraint solver determines the robotic solution corresponding to pre-defined or identified constraint conditions. For example, the constraint solver may include motion planning algorithm, forward and backward kinematics determinator, collision detection and avoidance algorithm, etc. In one embodiment, the constraint solver may be auto-selected and included in the robotic solution recipe by the software framework 104 depending on the hardware component selected by the user. For example, when a robot that has at least one moving component is selected as a hardware component to be included in a reusable robotic solution recipe then a path planning algorithm (software component) may be auto-selected and included in the robotic solution recipe by the software framework. In one embodiment, the constraint solver is selected by a user at the web UI 110.

The software components may be added to the software component store 106 by a software developer. In one embodiment, the software component store 106 defines one or more criteria for adding a software component to the software component store 106. For example, the criteria for adding the software component may include that the added software component provides at least one or more useful functionalities and is reusable.

For example, a software component added to the software component store 106 may include an object_detection software component that detects an object using a camera video feed. The object_detection software component may include executable file that subscribes to raw images from a camera and publishes the detected object. The software component also includes logic to process the raw image to detect the object. The added object_detection software may be reused in any robotic solution that requires a robot to detect object using captured image.

In order for the software component to meet the criteria the software component may include, for example, software libraries, datasets, configuration files, source code, executable files, etc. that allows the component to publish/subscribe to each other. The criteria also require the added software component to be reusable in any robotic solution. In one embodiment, the criteria may also include API compatibility of the software module with an API 112 included in the software framework 104.

In one embodiment, the user adding the software component to the software component store 106 may provide a software component that meets the above-mentioned criteria. Alternatively, the user may only provide a software code at the framework. In this case, the system automatically encapsulates the software code with a software wrapper to generate the software component. The software wrapper includes the different software entities that are required to generate the software component meeting the criteria, described above.

In one embodiment, the selected software components included in the cloud robotics solution recipe communicate with each other to provide the robotic solution. For example, in a bin picking solution, an image capturing package may capture images of objects in the bin and publish the captured "raw image" that is subscribed by an object detection package. The object detection package may then publish a detected object that is subscribed by a bin picking package that picks objects based on the detected object.

In one embodiment, a user at the web UI 110 can also map one or more selected software services to one or more selected hardware components. Mapping the software component to the hardware component indicate the hardware component that executes, or is connected to, the mapped software component. For example, an image capturing software component may be mapped to a camera hardware component that executes the image capturing software component.

In one embodiment, the software framework 104 also allows a user to add robotic solution execution information to a reusable robot solution recipe. A user may add the robotic solution execution information at the web UI 110. In one embodiment, the software framework 104 provides a Domain Specific Language (DSL) code that provides a robotic solution execution information template to assist a user in generating the robotic solution execution information for a robotic solution recipe. A DSL code is a computer language code specialized for a particular application domain. In one embodiment, the DSL code is a modifiable and extensible code, specialized for "logistics" domain, provided by the software framework 104 at the web UI 110. In this case, the DSL code includes robotic solution execution information template corresponding to logistics domain that allows a system integrator or any user in the logistics domain to easily understand and modify the DSL code for generating the robotic solution execution information of a robotic solution recipe in the logistics domain.

The DSL code provided by the software framework 104 may include several functionalities that in combination define a robotic solution execution in the logistics domain. The functionalities may include a declaration functionality, a configuration functionality, and different robotic solution logic. The declaration functionalities include hardware component and environment declarations required for defining a robotic solution in a logistics domain. The different declarations may include environment description, environment constants, and environment constraints. The declaration also includes product description of the product that is planned to execute the robotics solution recipe, supported hardware, and communication interface.

The configuration functionality included in the DSL code allows a user to select various configuration related to the hardware component, software component, and environment for executing the robotic solution. Configuration includes parameter values for parameters related to the hardware component, the software component, and the environment. The configuration may be defined based on the different functions that a particular hardware has to perform to execute the robotic solution. For example, the configuration for a robotic arm may define robot arm's orientation (parameter values) in the x, y, and z coordinates (parameters) that defines the arm's position when performing a particular action. Further for an environment, the configuration received may include a region of interest (pick and place location in case of a bin-picking solution), etc. In one embodiment, the configuration may be auto-determined depending on the robotic solution recipe that is to be generated.

In one embodiment, the robotics solution logic includes different software functions for defining the robotic solution. For example, the DSL code may include a loop function that is used to define a repetitive activity that is to be executed by one or more robots during execution of the robotic solution. For example, a "while" loop function that define activities, including repetitive activities, to be performed by one or more robots when the "while" loop function condition is satisfied. The robotics solution logics included in the DSL code may also allow a user to define a condition, for example an in-then-else condition, and actions that needs to be performed based on satisfying or non-satisfying of the condition.

In one embodiment, several DSL code examples, including declaration, configuration, and robot solution logic, are provided specific to different use cases within the transportation domain. For example, a DSL code example may be provided for a pick-and-place solution (from a bin to a conveyor belt or from a conveyor belt to a bin), palletization and depalletization solution, robot cell automation, line automation, assembly operation, laser cutting operation, welding operation, etc.

Based on the robotic solution that a user wants to execute one of the DSL code examples is selected at the web UI and included in the reusable robotics solution recipe. In one embodiment, the declaration functionality, configuration functionality, and/or different robotics solution logic included in the DSL code may be modified by the user depending on specific requirements for a particular transportation solution. In one embodiment, the robotic solution recipe also includes a glue code that is an executable code (often source code) that serves solely to "adapt" different parts of code that may otherwise be incompatible. In one embodiment, the glue code in the robotic solution recipe adapts the different parts of the selected hardware and software components and any other DSL software component received from a software or hardware developer.

In one embodiment, the web UI 110 allows a user to upload an environment map of an environment where the robotic solution is to be executed. The position of the various environment objects in the environment map may be included in a model descriptor file. The model descriptor file may also include information relating to position of the different hardware components with respect to the environment. The position of the different hardware components, which is included in the model descriptor file, may be provided at the web UI 110. The selected software and hardware components, the defined robotic solution logic, the model descriptor file, and the glue code together form the robotic solution recipe that is executed for simulating or executing the robotic solution.

In one embodiment, a teach pendant (not shown) may be used instead of the software framework 104 to generate the robotic solution recipe. A teach pendant is a control box for programming the motions of a robot. Teach pendants are typically handheld devices and may be wired or wireless. In one embodiment, a user can select a "generate" or "compose" option at the web UI 110 or teach pendant to generate the robotics solution recipe based on the received selection of hardware and software services, the environment, and the received robotic solution execution information.

In one embodiment, the software framework 104 includes an API 112 that deploys the robotics solution recipe to a simulator 114 or a vendor-agnostic hardware controller 116. In one embodiment, the API 112 is a Robot Operating System (ROS) API that uses a publish-subscribe model to communicate with the simulator 114 and hardware vendor-agnostic controller 116. The simulator 114 generates a simulation model based on the model descriptor file included in the reusable robotic solution recipe. The simulated model includes the simulated robot solution environment and the selected hardware and software components in the robot solution recipe.

Next execution of the robotic solution is simulated by executing the robotic solution execution information. In one embodiment, a two-way communication is established between the simulator 114 and the web UI 110. Based on the established communication, the simulation model including the simulated environment and the hardware components generated by the simulator 114 is displayed at the web UI 110. The web UI 110 also displays the simulated execution of the robotic solution based on the execution of the reusable robotic solution recipe by the simulator 114. In one embodiment, based on the execution of the robotics solution recipe instructions are sent from the simulator to the simulated hardware components. Further, the simulated hardware components send execution and sensor data to the simulator 114 that is then used by the simulator 114 to determine instruction that is then sent to the simulated hardware components to simulate execution of the robotic solution.

In one embodiment, the web UI 110 also allows a user to add, remove, or modify existing environment components in the simulated environment displayed at the web UI 110. After a change to the environment components, a user can simulate execution of the robotic solution to determine whether the robotic solution recipe can be executed when the environment components are changed.

In one embodiment, the cloud device management system 102 also includes a device manager 118 that manages communication between the cloud device management system 102 and one or more devices. In one embodiment, the device manager 118 automatically installs a device client at one or more devices. The installed device client automatically initiates a communication between the device manager 118 and the one or more devices installed with the device clients. In one embodiment, a two-way communication is established between the device manager 118 and the devices installed with the device client. In one embodiment, the vendor-agnostic hardware controller 116 is a device for the device manager 118.

The device manager 118 installs a device client at the vendor-agnostic hardware controller 116 based on which a two-way communication is established between the device manager 118 and the vendor-agnostic hardware controller 116. The device manager 118 receives the reusable robotics solution recipe from the API 112 and then deploys the reusable robotics solution recipe to the vendor-agnostic hardware controller 116.

The vendor-agnostic hardware controller 116 is a controller that communicates with several vendor specific hardware controllers controlling different hardware components. In one embodiment, the cloud device management system includes a device manager that acts as a central control bus for controlling a device client. In one embodiment, the device manager installs the device client at a vendor-agnostic controller based on which a two-way communication is established between the device manager and the vendor-agnostic hardware controller.

Based on the established communication, the device manager 118 deploys the robotics solution recipe to the vendor-agnostic hardware controller 116. In one embodiment, the vendor-agnostic hardware controller 116 executes the reusable robotic solution recipe to execute the robotic solution. Based on the execution of the reusable robotic solution recipe, the vendor-agnostic hardware controller 116 sends execution instructions directly to hardware components that execute the robotic solution or vendor-specific hardware controller that controls execution of the robotic solution by the hardware components.

In case of communication with the vendor-specific hardware controller, the hardware-vendor agnostic controller communicates with the vendor-specific hardware controller using vendor specific drivers selected from the software component store 106. The vendor specific drivers allow the vendor-agnostic controller to communicate with the vendor specific drivers using a vendor specific device driver included in the robotic solution recipe.

Based on the received instruction the hardware component initiate execution of the robotic solution. In one embodiment, the different software components mapped to the hardware components are deployed to the hardware components. The hardware components that may have installed software component/s then executes the robotic solution based on the instructions received from the vendor-agnostic hardware controller or vendor-specific hardware controller executing the robotic solution recipe.

For example, the vendor-agnostic hardware controller 116 may generate an execution instruction based on executing the deployed reusable robotics solution recipe and then directly send the instruction to hardware components 120, 122 and 124, 126 manufactured by two different manufacturers. Alternatively, the vendor-agnostic hardware controller 116 wraps the instruction with a hardware-vendor specific device driver and sends it to the vendor specific hardware controllers 128 and 130. The vendor specific hardware controllers 128 and 130 then sends the instructions to hardware components 120, 122 and 124, 126, respectively. Additionally, the hardware components 120, 122 and 124, 126 send the execution result and sensor data either directly to the vendor-agnostic hardware controller 116 or to the vendor-specific hardware controllers 128 and 130, respectively.

The present solution therefore provides a technical solution in the field of robotics. Specifically, the current technical solution allows a user to easily define a robot solution at a web UI or a teach pendant and then execute the complex robotic solution using a hardware-vendor agnostic controller. The present invention also allows simulation of the generated solution including the functionality of adding/removing different hardware or environment constraints in the simulation and checking whether the reusable robotic solution recipe executes in the changed environment. Additionally, the vendor-agnostic controller allows sending instructions to hardware components manufactured by any hardware manufacturer.

Figure 2:
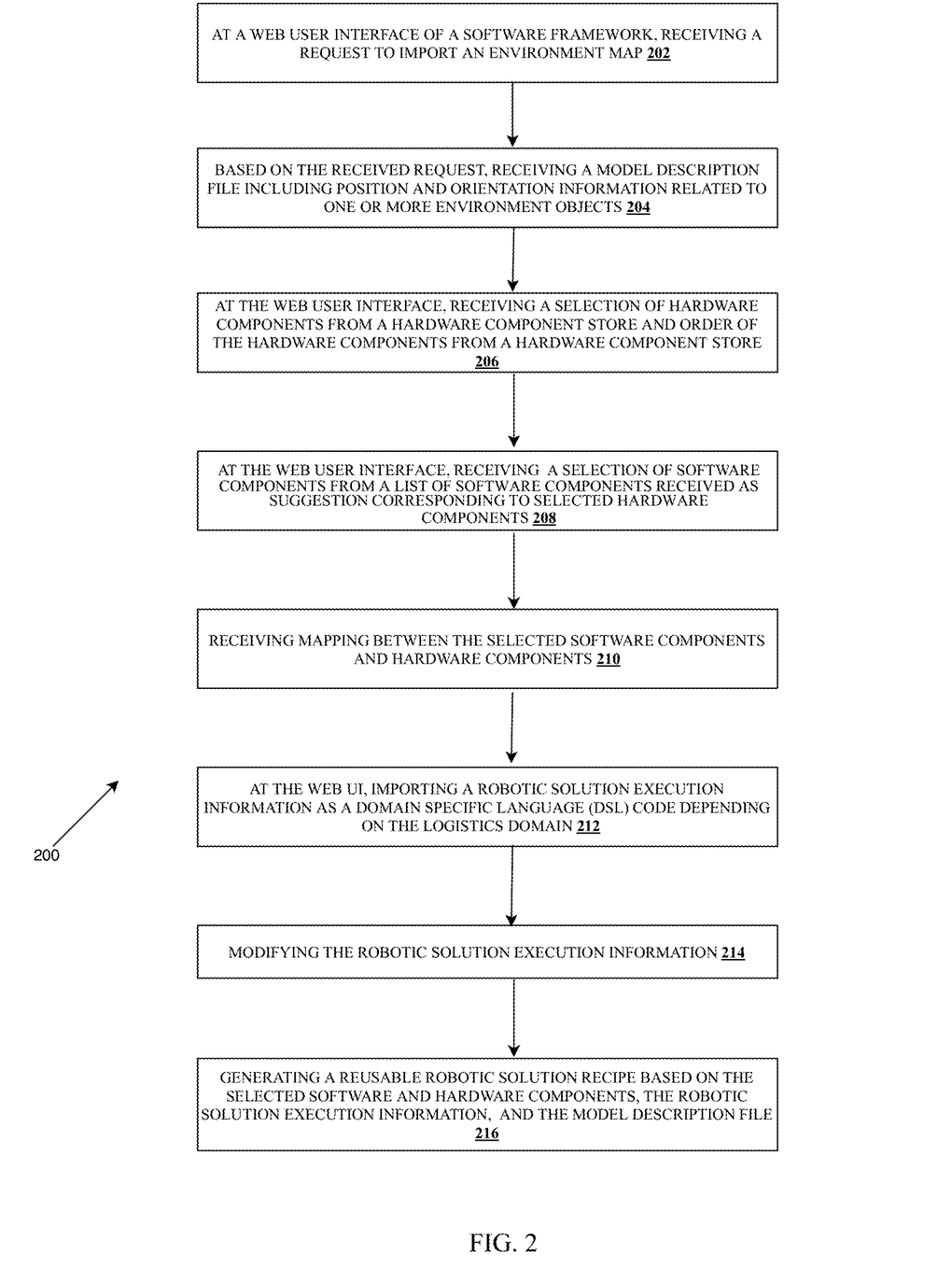
FIG. 2 is a block diagram illustrating a process to generate a reusable robotic solution, according to an embodiment.

FIG. 2 is a block diagram 200 illustrating a process to generate a reusable robotic solution, according to an embodiment. Initially an environment map is imported at a web user interface of a software framework (202). In one embodiment, the environment map is received as a 2-dimensional (2D) map. The 2D map may be received for an area where the robotics solution is to be executed. For example, the 2D map be of a warehouse that includes the 2D coordinates defining the boundary of the warehouse and the 2D-coordinates of the different objects placed in the warehouse.

Next a model description file that includes position and orientation information of one or more environment objects included in the environment map are received at the web user interface of the software framework (204). A model descriptor file may be a Unified Robot Description Format (URDF) file that includes the position and orientation (rotation and scale) of the different environment objects. For example, a URDF file for a warehouse boundary or "wall" may include three-dimensional position coordinates of a wall in the warehouse, the angle at which the wall may be inclined with respect to a fixed point or a fixed line, and scaling parameters to identify and change the size of different environment objects with respect to each other. In one embodiment, a 3D-map of the environment that includes position and orientation information is received at the web user interface of the software framework at 202.

Next at the web user interface a selection of hardware components and an order of the hardware components is received from a hardware component store (206). The hardware components are the components selected to execute the robotic solution. In one embodiment, an order of the hardware components is also received. The order is the order in which the different hardware components are arranged either in a horizontal direction or in a vertical direction. For example, a robotic arm and a table may be selected as hardware components and the order may be robotic arm and table. In this case, the order indicates that the robotic arm is to be placed on the table.

Next at the web user interface a selection of the software components is received from a list of software components received as suggestion corresponding to the selected hardware components (208). Next mapping is received between the selected software components and hardware components (210). For example, the selected software component may be an image capturing software and then a mapping may be defined between the image capturing software and a selected camera hardware.

Next the robotic solution execution information as a domain specific language (DSL) is imported at the web UI depending on the logistics domain (212). As discussed above, the robotic solution execution information is imported depending on the logistics domain area, for example, welding, bin-picking, etc. The imported robotic solution execution information is then modified at the web UI (214).

Finally based on the selected software and hardware components, the robotic solution execution information, and the model description file a reusable robotic solution recipe is generated. (216)

Figure 3:
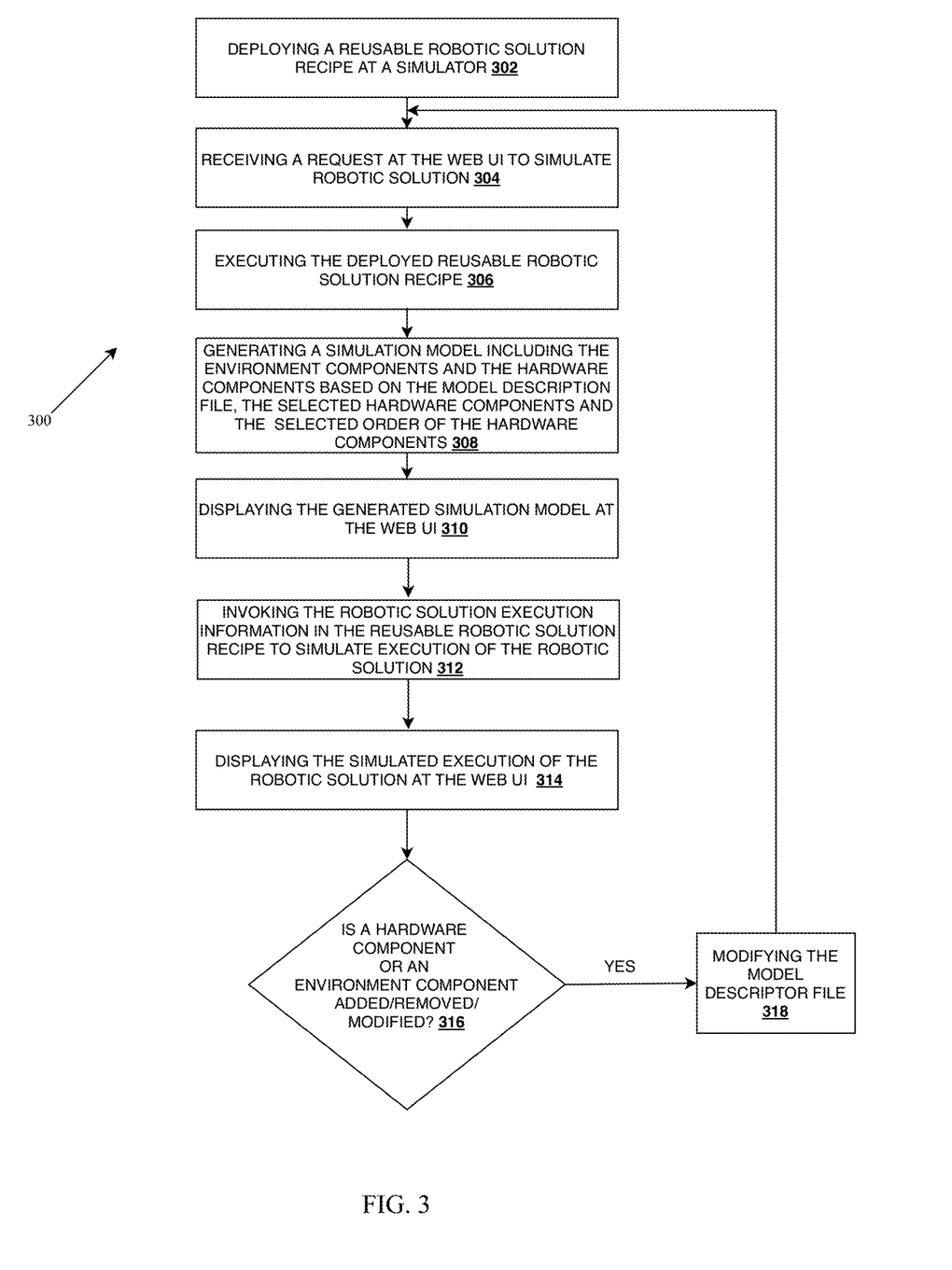
FIG. 3 is a block diagram illustrating a process to simulate execution of robotic solution based on execution of the reusable robotic solution recipe, according to an embodiment.

FIG. 3 is a block diagram illustrating a process 300 to simulate execution of robotic solution based on execution of the reusable robotic solution recipe, according to an embodiment. Initially the reusable robotic solution recipe is deployed at a simulator (302). Next a request is received at the web UI to simulate the robotic solution (304). In one embodiment, based on the received request the deployed reusable robotic solution recipe is executed (306).

Next based on the execution of the deployed reusable robotic solution recipe a simulation model is generated including environment components and hardware components based on model description file, selected hardware components, and selected order of hardware components (308). Next the generated simulation model is displayed at the web UI (310). Next the robotic solution execution information in the reusable robotic solution recipe is invoked to simulate execution of the robotic solution (312). As discussed above, the robotic solution execution information includes logic to execute the robotic solution. Based on the execution of the robotic solution execution information, the simulation model sends execution instruction to the simulated hardware components for executing the robotic solution.

Next the simulated execution of the robotic solution is displayed at the web UI (314). In one embodiment, a user may add, remove, or modify environment component or hardware component at the web UI. For example, the user may add a wall ("environment component") and modify (change rotation angle or increase/decrease size) the wall in the displayed simulated execution. The user may also remove the wall. Allowing the user to change hardware component and environment component to easily check whether the robotic solution executes when the hardware component or environment component is changed. Next in case the hardware component or environment component is changed (added/removed/modified) (condition in 316 is true) then the model descriptor file is modified (318).

Modifying the model description file includes adding, removing, or modifying model description file depending on changes to the hardware component or environment component. After the modification, 304-314 are executed to display simulated execution of the robotic solution after changes to the hardware or environment component.

Figure 4:
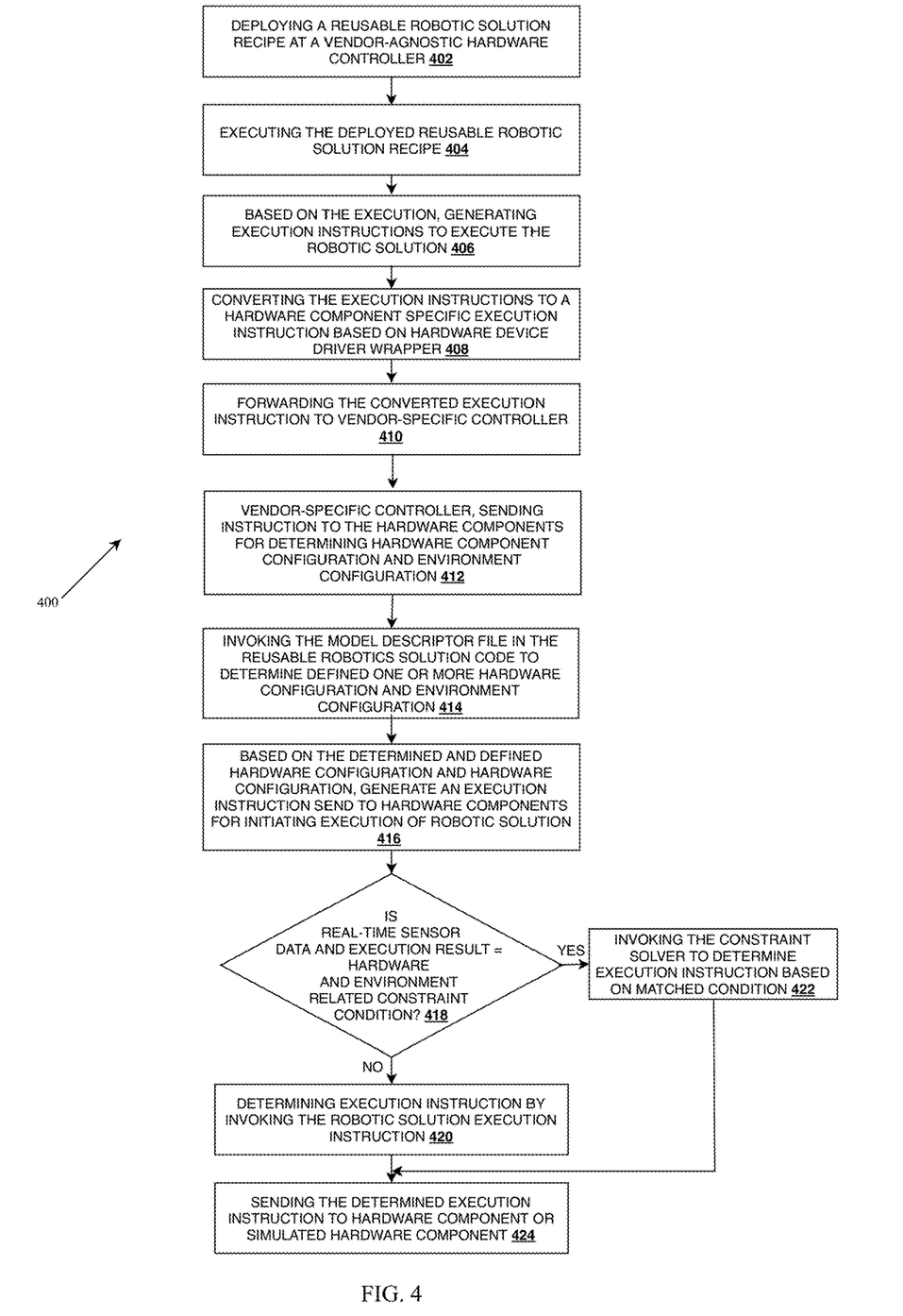
FIG. 4 is a block diagram illustrating a process to execute a robotic solution, according to an embodiment.

FIG. 4 is a block diagram illustrating a process 400 to execute a robotic solution, according to an embodiment. Initially the reusable robotic solution recipe is deployed at a vendor-agnostic hardware controller (402). The vendor-agnostic hardware controller then executes the deployed reusable robotic solution recipe (404).

Based on the execution of the reusable robotic solution by the vendor-agnostic hardware controller, execution instructions are generated to execute the robotic solution (406). Next the generated execution instruction is converted to a hardware component specific execution instruction based on a hardware device driver wrapper (408). The hardware device driver wrapper is a software component that converts the execution instructions in a format that can be understood by a vendor-specific controller and hardware components of different vendors. In one embodiment, the vendor-agnostic controller can directly communicate with the hardware components and send the execution instructions to the hardware components without conversion.

Next the converted execution instruction is forwarded to vendor-specific controller (410). In one embodiment, the vendor-specific controller sends instruction to the hardware components for determining the hardware component configuration and environment component configuration (412). A hardware component configuration and environment component configuration include current position and orientation information of the hardware and environment component configuration. The hardware component configuration and environment component configuration may be determined by any hardware component, for example a camera hardware component or sensor hardware component. In one embodiment, a simulated camera or simulated sensor determines the hardware and environment configuration, for example, the position of a robotic arm or a warehouse table within an environment is determined.

Next the model descriptor file in the reusable robotic solution recipe is invoked to determine the defined one or more hardware component configuration and environment component configuration (414). Based on the determined and defined configuration, an execution instruction is generated and send to the hardware component for initiating execution of the robotic solution (416). In one embodiment, the determined and defined configuration are compared to determine whether the determined configuration is different than the defined configuration (418). In case the determined configuration is different from the defined configuration then the execution instructions are modified such that the robotic solution may be executed after the changed configuration. For example, consider a robotic arm that has a defined configuration including position (0, 0, 2) and determined configuration (0.3, 0, 2).

In this case the determined configuration may be defined by a camera mounted on the robotic arm. The determined configuration is 0.3 m ahead of the defined configuration and therefore an execution instruction to the robotic arm may not work properly. In this case, the vendor-agnostic controller generates an execution instruction by invoking the robotic solution execution information and then modifies the execution instruction considering the determined configuration information. For example, the robotic arm in this case may be send a modified pick instruction considering the modified position of the robotic arm.

The vendor-agnostic hardware controller receives sensor-data and execution result from a hardware component or simulated hardware component. In one embodiment, the vendor-agnostic controller compares the received real-time sensor data and/or execution result with a stored hardware or environment related constraint condition. As discussed above a constraint condition indicates a condition under which the robotic solution cannot be partially or completely executed. In case, the received and the real-time sensor data and execution result does not match (condition in 418 is "false") any hardware and environment related constraint condition then the vendor-agnostic determines an execution instruction by invoking the robotic solution execution instruction (420).

In case the real-time sensor data and/or execution result matches the hardware or environment related constraint condition (condition in 418 is "yes") then a constraint solver is invoked by the vendor-agnostic controller to determine execution instruction based on the matched condition (422). For example, when an obstacle is detected by sensor that is blocking movement of a robotic arm then a motion planning constraint solver may be invoked to determine a new path for moving the robotic arm that avoids the obstacle. Finally, the determined execution instruction is sent to the hardware component or simulated hardware component (424). Based on the received execution instruction the robotic solution is executed.

Figure 5:
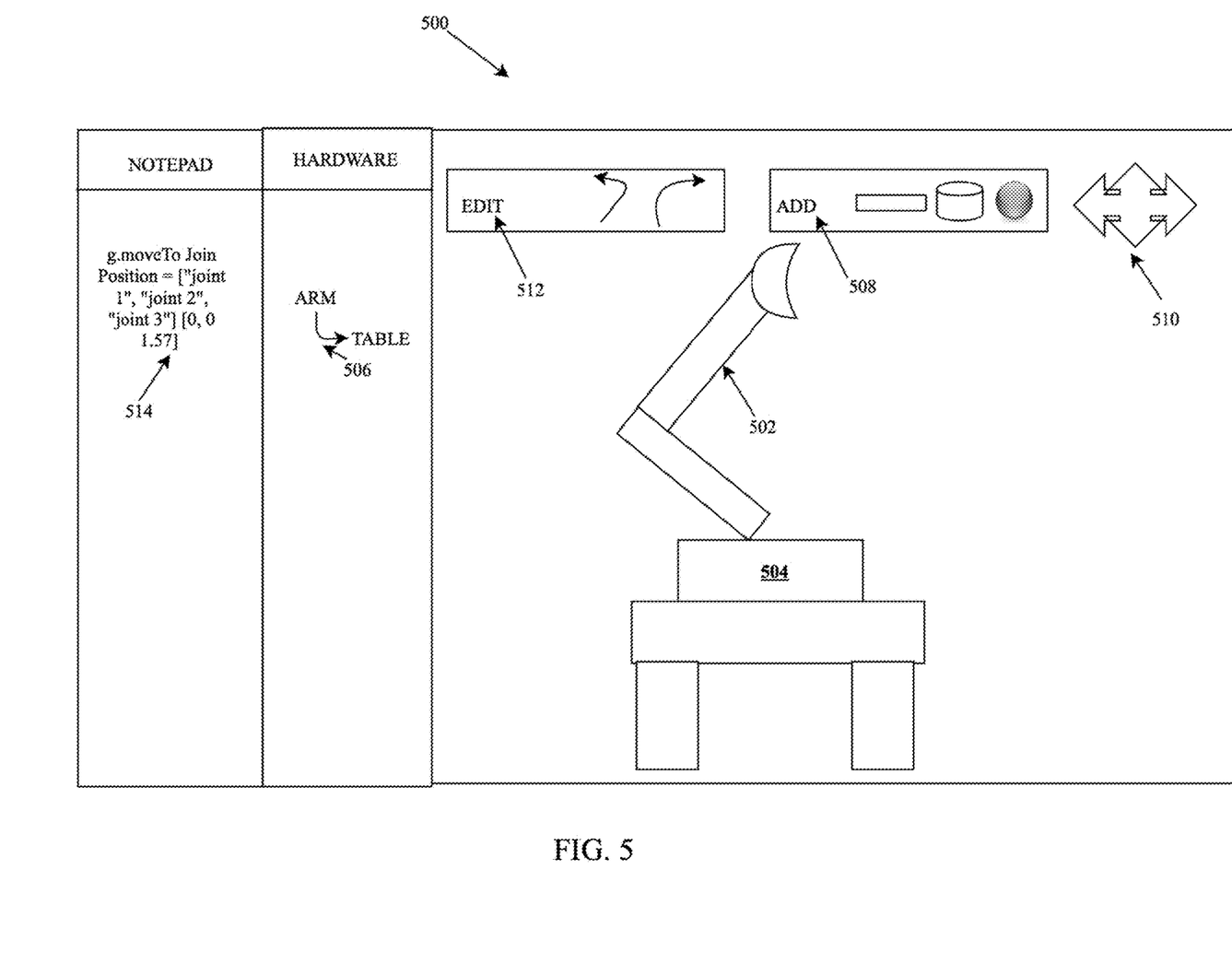
FIG. 5 is an exemplary block diagram illustrating a software framework to generate, simulate, and execute a reusable robotic solution recipe, according to an embodiment.

FIG. 5 is an exemplary block diagram illustrating a software framework 500 to generate, simulate, and execute a reusable robotic solution recipe, according to an embodiment. Two hardware components an "arm" 502 and "table" 504 are selected as hardware components. As shown, a user provides the order 506 in which the hardware components are to be arranged in the simulation. The software framework 500 also allows a user to add 508, modify 510, or edit 512 hardware or environment components and check whether the robotic solution executes when any of the hardware components are modified. The software framework 500 also allows modifying robotic solution execution information to change the joint angle of the robot arm 502.

The embodiment disclosed herein specifies methods and systems for generating, simulating, and executing a reusable robotic solution. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high-speed integrated circuit Hardware Description Language (VHDL) another programming language or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments herein can be practiced with modification within the spirit and scope of the claims as described herein.

What is claimed is:

1. A computer implemented method to generate, simulate, and execute a reusable robotic solution recipe for executing a robotic solution, the method comprising:
   at a web user interface of a software framework, receiving a selection of one or more hardware components to be included in the reusable robotic solution recipe;
   at the web user interface of the software framework, displaying one or more software components as suggestion corresponding to the selected one or more hardware components;
   receiving a selection of a software component from the displayed one more software components to be included in the reusable robotic solution recipe;
   deploying the reusable robotic solution recipe to a hardware-vendor agnostic controller;
   the hardware-vendor agnostic controller executing the reusable robotic solution recipe to:
      determine one or more hardware component configuration and environment component configuration of the environment for executing the robotic solution;
      invoke a model descriptor file to determine defined one or more hardware components configuration and environment data configuration of one or more of a simulated hardware component and the selected one or more hardware components defined to execute the robotic solution, the simulated hardware component is a simulation of the one or more hardware components;
      based on the determined and the defined one or more hardware components configuration and environment component configuration, initiating execution of the robotic solution;
      determine whether a real-time sensor data received from a sensor at the one or more of the simulated hardware component and the one or more hardware components matches with one of a hardware and environment related constraint condition defined at the reusable robotic solution recipe;
      determine an execution instruction based on the matched condition; and
      send the determined execution instruction to the simulated hardware component and the selected one or more hardware components for executing the robotic solution.

2. The computer implemented method according to claim 1, wherein the matched condition includes a hardware and environment constraints, and wherein determining the execution instruction comprises:
   invoking a constraint solver to determine a constraint solution corresponding to a matched hardware and environment constraint; and
   sending the execution instruction based on the determined constraint solution to the simulated hardware component and the one or more hardware components for executing the robotic solution.

3. The computer implemented method according to claim 1, further comprising:
   generating a simulation model based on the model descriptor file; and
   modifying the simulation model based on the execution of the reusable robotic solution recipe.

4. The computer implemented method according to claim 1, wherein establishing the communication between the hardware-vendor agnostic controller and the simulated hardware component and the selected one or more hardware components defined to execute the robotic solution comprises:
   importing a hardware device driver wrapper corresponding to a vendor-specific controller of the one or more selected hardware components at the vendor-agnostic hardware controller;
   converting an execution instruction to a hardware component specific execution instruction based on the imported hardware device driver wrapper included in the reusable robotic solution recipe; and
   sending the converted execution instruction to the vendor-specific controller of the one or more selected hardware components in a vendor specific communication protocol.

5. The computer implemented method according to claim 1, further comprising:
   at the web user interface of the software framework, receiving a simulation request to simulate the robotic solution based on the reusable robotic solution recipe; and
   based on the received request, displaying the simulated execution of the robotic solution based on the reusable robotic solution recipe.

6. The computer implemented method according to claim 5, further comprising:
   at the simulation displayed at the web user interface of the software service, modifying the one or more hardware components and the environment to monitor in real-time a change in the robotic solution execution based on the modification; and
   generating a modified model descriptor file based on the modification.

7. The computer implemented method according to claim 1, further comprising:
   at the web user interface of the software framework, receiving selection of one or more hardware component configuration and environment component configuration to generate the reusable robotic solution recipe; and
   at the web user interface of the software framework, receive mapping between a software component from the one or more software components and the one or more hardware components.

8. The computer implemented method according to claim 7, further comprising:
   deploying the one or more software components to the one or more hardware components based on the mapping; and
   executing the deployed software component at the hardware component.

9. The computer implemented method according to claim 1, further comprising:
   at the web user interface of the software service, retrieving the reusable robotic solution recipe;
   modifying at least one of the one or more parameters defined at the reusable robotic solution recipe and invoked by the robotic solution recipe; and
   based on the modification, generating a modified reusable robotic solution recipe.

10. A computer system to generate, simulate, and execute a robotic solution recipe for executing a robotic solution, the system comprising:

a memory storing a program code; and
a processor executing the program code to:
  at a web user interface of a software framework, receive a selection of one or more hardware components to be included in the reusable robotic solution recipe;
  at the web user interface of the software framework, display one or more software components as suggestion corresponding to the selected one or more hardware components;
  receive a selection of a software component from the displayed one more software components to be included in the reusable robotic solution recipe;
  deploy the reusable robotic solution recipe to a hardware-vendor agnostic controller;
  the hardware-vendor agnostic controller executing the reusable robotic solution recipe to:
    determine one or more hardware component configuration and environment component configuration of the environment for executing the robotic solution;
    invoke a model descriptor file to determine defined one or more hardware components configuration and environment data configuration of one or more of a simulated hardware component and the selected one or more hardware components defined to execute the robotic solution, the simulated hardware component is a simulation of the one or more hardware components;
    based on the determined and the defined one or more hardware components configuration and environment component configuration, initiating execution of the robotic solution;
    determine whether a real-time sensor data received from a sensor at the one or more of the simulated hardware component and the one or more hardware components matches with one of a hardware and environment related constraint condition defined at the reusable robotic solution recipe;
    determine an execution instruction based on the matched condition; and
    send the determined execution instruction to the simulated hardware component and the selected one or more hardware components for executing the robotic solution.

11. The computer system according to claim 10, wherein the processor further executes the program code to:
  invoke a constraint solver to determine a constraint solution corresponding to a matched hardware and environment constraint; and
  send the execution instruction based on the determined constraint solution to the simulated hardware component and the one or more hardware components for executing the robotic solution.

12. The computer system according to claim 10, wherein the processor further executes the program code to:
  generate a simulation model based on the model descriptor file; and
  modify the simulation model based on the execution of the reusable robotic solution recipe.

13. The computer system according to claim 10, wherein the processor further executes the program code to:
  import a hardware device driver wrapper corresponding to a vendor-specific controller of the one or more selected hardware components at the vendor-agnostic hardware controller;
  convert an execution instruction to a hardware component specific execution instruction based on the imported hardware device driver wrapper included in the reusable robotic solution recipe; and
  send the converted execution instruction to the vendor-specific controller of the one or more selected hardware components in a vendor specific communication protocol.

14. The computer system according to claim 10, wherein the processor further executes the program code to:
  at the web user interface of the software framework, receive a simulation request to simulate the robotic solution based on the reusable robotic solution recipe; and
  based on the received request, display the simulated execution of the robotic solution based on the reusable robotic solution recipe.

15. The computer system according to claim 14, wherein the processor further executes the program code to:
  at the simulation displayed at the web user interface of the software service, modify the one or more hardware components and the environment to monitor in real-time a change in the robotic solution execution based on the modification; and
  generate a modified model descriptor file based on the modification.

16. The computer system according to claim 10, wherein the processor further executes the program code to:
  at the web user interface of the software framework, receive selection of one or more hardware component configuration and environment component configuration to generate the reusable robotic solution recipe; and
  at the web user interface of the software framework, receive mapping between a software component from the one or more software components and the one or more hardware components.

17. The computer system according to claim 16, wherein the processor further executes the program code to:
  deploy the one or more software components to the one or more hardware components based on the mapping; and
  execute the deployed software component at the hardware component.

18. The computer system according to claim 10, wherein the processor further executes the program code to:
  at the web user interface of the software service, retrieve the reusable robotic solution recipe;
  modify at least one of the one or more parameters defined at the reusable robotic solution recipe and invoked by the robotic solution recipe; and
  based on the modification, generate a modified reusable robotic solution recipe.

19. A non-transitory computer-readable medium to store instructions, which when executed by a computer, cause the computer to perform operations comprising:
  at a web user interface of a software framework, receive a selection of one or more hardware components to be included in the reusable robotic solution recipe;
  at the web user interface of the software framework, display one or more software components as suggestion corresponding to the selected one or more hardware components;
  receive a selection of a software component from the displayed one more software components to be included in the reusable robotic solution recipe;
  deploy the reusable robotic solution recipe to a hardware-vendor agnostic controller;

the hardware-vendor agnostic controller executing the reusable robotic solution recipe to:
  determine one or more hardware component configuration and environment component configuration of the environment for executing the robotic solution;
  invoke a model descriptor file to determine defined one or more hardware components configuration and environment data configuration of one or more of a simulated hardware component and the selected one or more hardware components defined to execute the robotic solution, the simulated hardware component is a simulation of the one or more hardware components;
  based on the determined and the defined one or more hardware components configuration and environment component configuration, initiating execution of the robotic solution;
  determine whether a real-time sensor data received from a sensor at the one or more of the simulated hardware component and the one or more hardware components matches with one of a hardware and environment related constraint condition defined at the reusable robotic solution recipe;
  determine an execution instruction based on the matched condition; and
  send the determined execution instruction to the simulated hardware component and the selected one or more hardware components for executing the robotic solution.

20. The computer-readable medium of claim 19, further comprises instructions which when executed by the computer further cause the computer to:
  invoke a constraint solver to determine a constraint solution corresponding to a matched hardware and environment constraint; and
  send the execution instruction based on the determined constraint solution to the simulated hardware component and the one or more hardware components for executing the robotic solution.

* * * * *